United States Patent

[11] 3,601,491

[72] Inventor William Reid Smith-Vaniz
 14 Pasture Lane, Darien, Conn. 06820
[21] Appl. No. 645,567
[22] Filed June 7, 1967
[23] Division of Ser. No. 566,050, July 18, 1966, abandoned.
[45] Patented Aug. 24, 1971

[54] DISTANCE-MEASURING INTERFEROMETER
 4 Claims, 6 Drawing Figs.
[52] U.S. Cl. .................................................. 356/106
[51] Int. Cl. .................................................. G01b 9/02
[50] Field of Search .......................................... 88/14 I, 1
 U; 356/106–113; 350/149–151

[56] References Cited
 UNITED STATES PATENTS
 3,409,375 11/1968 Hubbard ..................... 356/106
 3,127,465 3/1964 Stephens ..................... 356/106
 3,182,551 5/1965 Piller ........................... 88/39
 3,379,887 4/1968 Stephany ..................... 350/149

OTHER REFERENCES

"Elliptical Polarizer" Block; Jos. A. 1960
" Messung Sehr Kleiner Verschiebungen mit einen Polarization Interferometer," Lebesque; Optik; Nov. 1964.

Primary Examiner—Ronald L. Wibert
Assistant Examiner—Conrad Clark
Attorney—Edward R. Hyde, Jr.

ABSTRACT: An interferometer for accurately measuring the displacement of a remotely positioned object includes means for projecting a first polarized beam of light at the object, for reflecting the projected beam from the object and for combining a reference beam of light with the reflected beam. The reference beam is of similar polarization and is orthogonally related to the first beam. Means are provided for converting the resultant beam to linearly polarized light and for detecting and indicating variations in the polarization plane of linearly polarized light. Displacement of the object causes variations in the plane of linear polarization and the magnitude, velocity, and direction of displacement are sensed and indicated.

INVENTOR.
William R. Smith-Vaniz

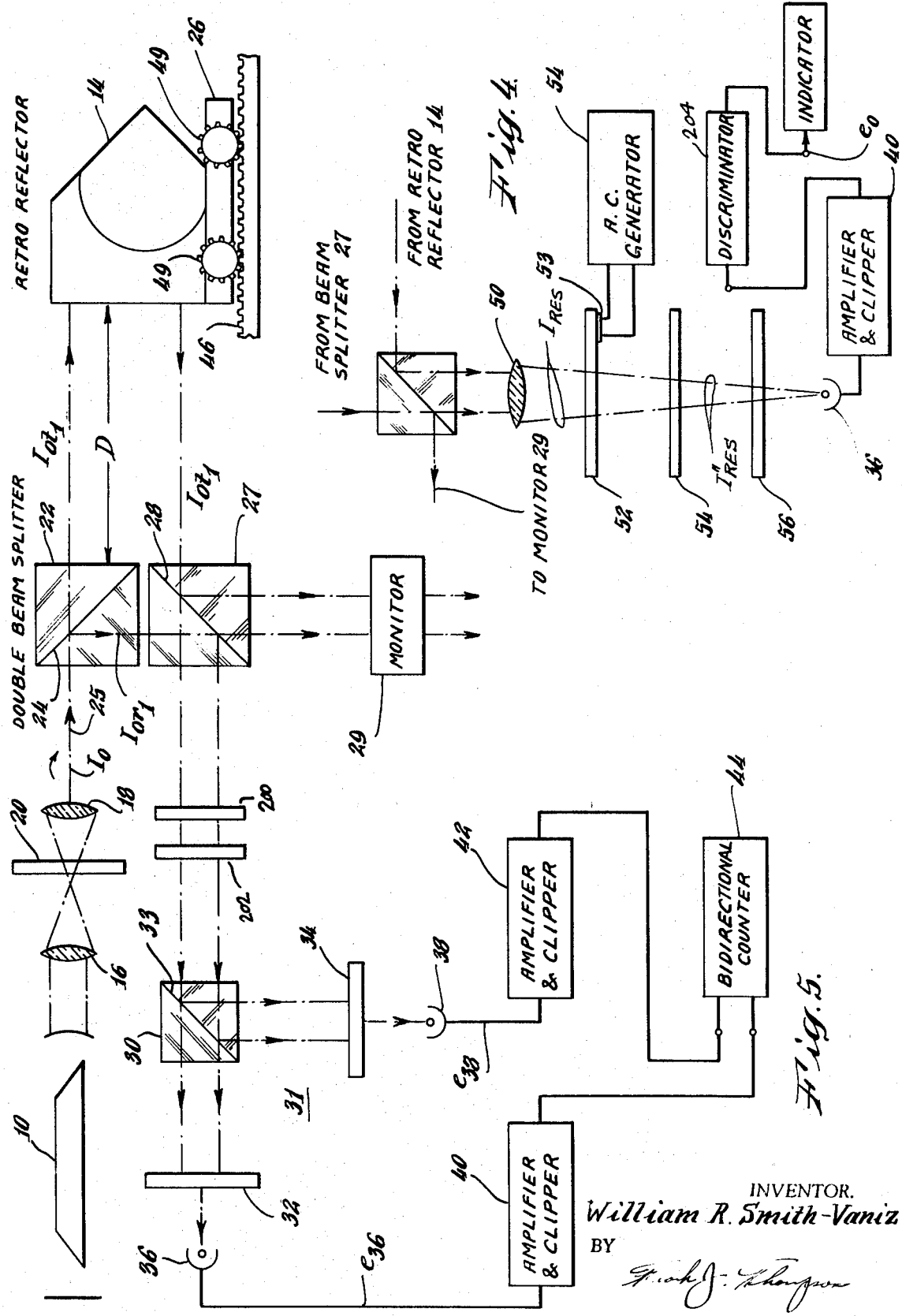

DISTANCE-MEASURING INTERFEROMETER

This application is a continuation-in-part of U.S. Pat. application Ser. No. 566,050, filed on July 18, 1966 and now abandoned.

This invention relates to interferometers and more particularly to interferometers adapted for measuring distance.

Interferometers which are employed for providing highly accurate measurements of distance generally comprise means for projecting a light beam from a source to an object whose distance is to be measured, for reflecting the beam from the object, and for interfering the projected beam with the reflected beam in order to establish a pattern of interference fringes. This class of interferometer is adjusted at times for providing that the zero order fringe fills the field. Fringe motion then refers to alternate brightening and darkening of the entire field. A displacement in the position of the object causes a corresponding motion of the fringes. Means also are provided for detecting and indicating the amount of fringe motion thereby providing an indication of the object's displacement.

Interferometers of this type were generally limited to measurements of object displacement over a relatively small distance because of the bandwidth or temporal incoherence of available light sources. However, the advent of the high intensity coherent light source such as provided by the laser renders it possible to now extend this measurement over a relatively large distance, i.e., 10 feet.

It is an object of the present invention to provide an improved form of interferometer adapted for detecting small displacements of an object over a relatively large distance.

Another object of the present invention is to provide an improved form of interferometer adapted for detecting and measuring displacements of an object over a relatively large distance.

In addition to indicating the magnitude of object displacement, it is also desirable to indicate the direction of displacement. Arrangements for counting moving fringes have employed a photocell to sense fringe motion and to indicate the magnitude thereof. However, additional means are required to sense and indicate the direction of motion. One form of interferometer employs two photocells and beam splitters which together are arranged for providing two phase-differing signals indicative of the magnitude and deviation of object motion. Output signals from the photocells are clipped at a half-fringe level and are applied to a counter circuit. Arrangements of this type, however, in addition to being relatively complex are subject to variations which may occur in the characteristics of the photocells, thereby affecting the clipping level and accuracy of the indication.

It is further desirable to sense and indicate the velocity of displacement of the object.

It is another object of this invention to provide an improved interferometer for indicating the magnitude and direction of displacement of an object over a relatively large distance.

Another object of the invention is to provide means for indicating the velocity of displacement of the object.

In accordance with a feature of the present invention, an interferometer for measuring the displacement of an object at a relatively large distance includes means for projecting at the object a polarized beam of light, means for reflecting the polarized light beam from the object and for combining with the reflected beam a reference beam which is similarly polarized and orthogonally related with respect to the reflected beam. Means are provided for converting the resulting beam into linearly polarized light. Movements of the object cause an accompanying rotation in the plane of polarization of the resultant linearly polarized light and a corresponding movement of fringes produced by the interference. Means are provided for detecting variations in the plane of the linear polarization and for indicating displacement of the object.

In accordance with another feature of the invention, means including a single photocell are provided for detecting variations in the plane of linear polarization and for indicating the velocity and the direction of displacement of the object.

These and other objects and features of the present invention will become apparent with reference to the following specifications and drawings wherein:

FIG. 4 is a diagram illustrating an arrangement utilizing a single photocell for detecting the velocity of displacement of the object; and, FIG. 5 is a diagram illustrates a further embodiment of the invention.

The general aspects of the present invention can best be understood by considering polarization of light as represented by points on a Poincare sphere. The use of the Poincare sphere is a technique for analyzing the result of the combination of light of differing polarizations. It is described in *Polarized Light, Production and Use*, William A. Shurcliff, Harvard University Press, Cambridge, Massachusetts, 1966, pp. 15-19, pp. 95-99. Orthogonally polarized light beams, which are discussed at page 6 of the referred-to text, combine to form a light beam defined by a circle on Poincare's sphere. The combined polarized beams comprise orthogonally related linearly polarized light, orthogonally related circularly polarized light (FIG. 1), and orthogonally related elliptically polarized light (FIG. 5). Orthogonally related beams can comprise two forms of linear polarization that differ by 90° in azimuth when the direction of propogation is the same. Right and left circularly polarized beams are orthogonal. Two elliptically polarized beams are orthogonal when the azimuths of the major axes differ by 90°, the handednesses are opposite, and the ellipticities are the same. The circle representing the resultant of the combined beams is rotated by suitable means, such as an optical retarder, into coincidence with a circle on the sphere corresponding to linearly polarized light. Variations in the plane of polarization of the resultant linearly polarized light are then detected to indicate object displacement. When the combination results in linearly polarized light, the use of the retarder can be avoided. The combination of circularly polarized light of opposite handedness represents such a case, and, for the purposes of simplifying the description, will be considered initially.

Figure 1:
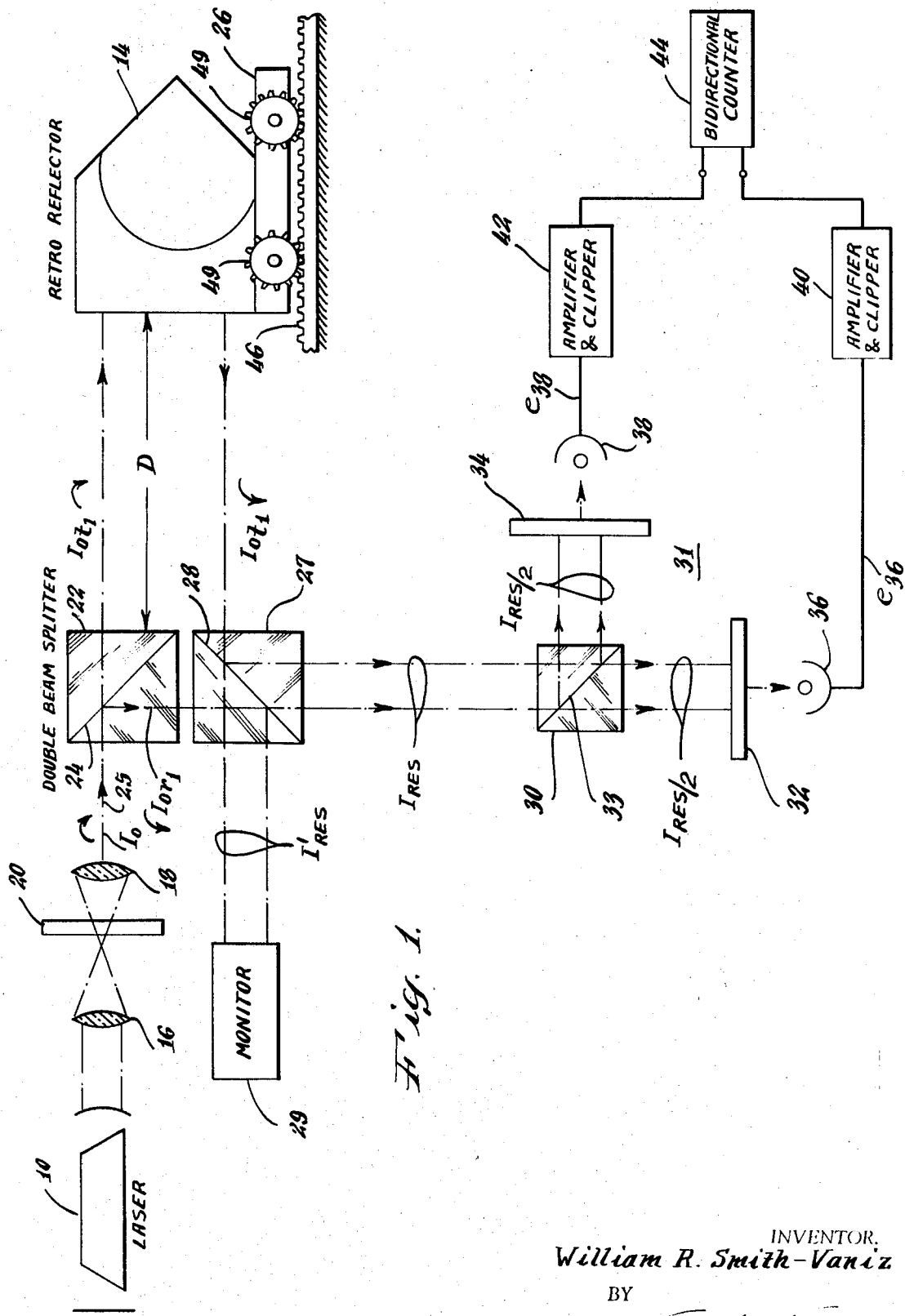
FIG. 1 is a diagram illustrating one embodiment of the present invention.

Referring now to FIG. 1, the interferometer is shown to include a source of high intensity coherent light comprising a laser 10. A light beam output from the laser is directed at a retroreflector 14 via a collimator including lens 16 and 18, a one quarter valve plate 20 which transforms the laser beam to circularly polarized light, and a first beam splitter 22. The beam splitter 22 comprises an optical quality glass having a half-silvered surface 24 for providing 50 percent transmission and 50 percent reflection. A circularly polarized beam of light $I_0$, indicated as 25 and which is incident on the surface 24 is divided by the beam splitter into a transmitted component $I_0 t_1$ and a reflected component $I_0 r_1$. The factors $t_1$ and $r_1$ respectively represent the fraction of $I_0$ which is transmitted and reflected. The sense of circular polarization of $I_0 t_1$ which is projected to the reflector 14 is indicated to be in a clockwise direction while the reflection at surface 24 causes $I_0 r_1$ to be polarized in a counterclockwise direction.

Retroreflector 14 is a conventional reflector means which is coupled to an object 26 (discussed hereinafter) for movement with the object. It is adapted to provide an odd number of reflections of $I_0 t_1$ thus reversing the sense of circular polarization of the beam. The reflected beam $I_0 t_1$ is indicated to be circularly polarized in a counterclockwise direction. The retroreflector comprises a corner cube with metallic reflective surfaces. As indicated, the number of reflections is odd, providing for the reversal in the direction of polarization. In addition, the use of a corner cube provides insensitivity to mounting angle.

A second beam splitter 27 is positioned with respect to the reflector 14 and beam splitter 22 for providing impingement on a surface 28 thereof by the reflected beam $I_o t_1$ and the beam $I_o r_1$. These beams at surface 28 are circularly polarized in an opposite sense and, neglecting any small loss in the transmission to and reflection from reflector 14, are of an equal intensity $A_1$. They thus produce a resultant linearly polarized wave $I_{res}$ having an angle of polarization $\theta$, measured with respect to some reference axis, and which varies in accordance with the distance traversed by the transmitted beam $I_o t_1$. Beam splitter 27 is formed of an optical quality glass and includes a surface 28 which is half-silvered for providing 50 percent transmission and 50 percent reflection. Linearly polarized resultants of the combined beams comprise the beams $I_{res}$ and $I'_{res}$ where $I_{res} = I_o(r_1 t_2 + t_1 r_2)$ and $I'_{res} = I_o(r_1 r_2 + t_1 t_2)$. The beam $I'_{res}$ impinges upon a monitor 29 which is provided for viewing fringes. The beam $I_{res}$ impinges upon a third beam splitter 30 of a detector and indicator means which is indicated generally as 31.

Included in the detector and indicator means 31 are means for transmitting a linearly polarized interference pattern at different angles of polarization and for providing electrical output signals indicative of the magnitude and direction of the fringe movement. The beam splitter 30 comprises an optical quality glass having a half-silvered surface 33 adapted for providing 50 percent transmission and 50 percent reflection. Output beams from the splitter 30 are transmitted along a preferential axis of polarization through polarizers 32 and 34 and impinge upon photocells 36 and 38 respectively. The polarizer 32 is adapted to transmit linearly polarized light polarized at a first angle $\theta$ with respect to some reference axis while the polarizer 34 is adapted to transmit polarized light at a second phase angle differing from $\theta$. For example, the second polarization angle may equal $\theta + 45°$. Thus, at a constant velocity of the retroreflector, an output signal $e_{38}$ from photocell 38 will differ in phase with an output signal $e_{36}$ from photocell 36 by 90°. These signals are amplified and clipped by conventional circuit means, represented by the blocks 40 and 42. When the object 26 is displaced, the output from the circuits 40 and 42 comprises two electrical signals having a relative phase which is indicative of the direction of displacement. These signals are applied to a bidirectional counter 44 which is adapted to increase an accumulated count when the object displacement is in one direction and to reduce the count when the object displacement reverses to an opposite direction. A counter of this type is described in U.S. Pat. No. 3,287,544.

In FIG. 1 the object 26 whose displacement is to be measured is shown to comprise a movable transport bed 26 of a machine tool (not illustrated). In order to illustrate the optical arrangement in greater detail, the relative size of the reflector 14 with respect to the bed 26 is greatly exaggerated. The bed may be driven by suitable means through ring gears 49, along a rack 46 to thereby provide motion of the tool. In an automated machining operation, indications of small variations in the motion of the bed and thus the tool are to be detected. As the bed 26 is moved from an initial position, the retroreflector 14 is similarly displaced. The plane of polarization of the linearly polarized wave produced by an interference of the beams rotates as the retroreflector 14 is displaced. The plane of polarization will rotate 360° for each displacement $(d)$ which is equal in length to one wavelength of light produced by the source 10. Each half-rotation of the vector of the linearly polarized wave will generate a cycle of light intensity variation which is transmitted along a preferential plane of polarization by the polarizers 32 and 34 to associated photocells. These cycles occur at a relatively rapid rate since a very small movement ($d$)=$\lambda/2$ of the bed 42, will generate a cycle. A succession of cycles establishes a pattern of moving interference fringes. The photocells respond to interference fringe movement. Movement of these fringes is proportional in magnitude and direction to the magnitude and direction of movement of the bed 26. Fringe movement is sensed by photocells 36 and 38 to generate electrical outputs $e_{36}$ and $e_{38}$. When the bed 26 moves to the left as viewed in FIG. 1, $e_{36}$ for example will lead $e_{38}$ while opposite movement causes $e_{38}$ to lead, and, $e_{36}$ to lag.

Figure 2A:
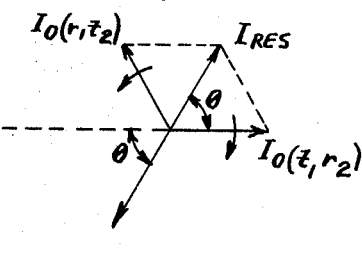
FIG. 2 is a vector diagram illustrating the vector representations of various light waves of FIG. 1.
Figure 2B:
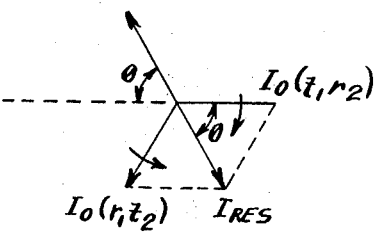

The operation of the interferometer may be seen more clearly with reference to the vector diagrams of FIG. 2. In FIG. 2a the direction of propagation of the light beams is out of the plane of the paper toward the reader. The component of light $I_o r_1$ which is reflected from surface 24 of the beam splitter 22 is indicated by the clockwise rotating vector $I_o r_1$. The light component which is reflected by the retroreflector 14 is represented by counterclockwise rotating vector $I_o t_1$. When the distance D (FIG. 1) between the beam splitter 22 and retroreflector 14 is constant, and since vector $I_o t_1$ and $I_o r_1$ are equal in amplitude and rotate at the same rate ($w$), then the resultant of the interfering rotating vectors in FIG. 2a is a vector $I_{res}$ which oscillates in amplitude at a constant angle $\theta$ with respect to a reference axis X. That is, a stationary object establishes a fixed phase relationship $\theta$ between the resultant vector and the reference axis X at the plane of interference. However, as the distance D is continuously varied, then the phase relationship $\theta$ at the plane of interference continuously varies. A rotating resultant vector $I_{res}$ is thereby generated. FIG. 2b indicates the phase relationship between the resultant vector and the X-axis at some other instant of time during movement of the retroreflector. The polarizers 32 and 34 are polarized for transmitting the light beam which impinges thereon along different preselected planes of polarization corresponding to angles $\theta_1$ and $\theta_2$ (not shown). For example, the polarizer 32 may be polarized for a plane of transmission corresponding to the Y-axis where $\theta_1 + 90$ while the polarizer 34 will be polarized for a plane of transmission $\theta_2$ which differs from $\theta_1$. Rotation of the resultant vector $I_{res}$ past these angles causes transmission of the interference pattern by the associated polarizer. The photocells 36 and 38 will then "see" moving fringes or alternate brightening and darkening of the field and the associated output voltages, as indicated hereinbefore, differ in phase in accordance with the direction of rotation of the resultant vector.

In FIG. 5, an arrangement is illustrated which combines orthogonally related elliptically polarized light beams. The arrangement of FIG. 5 includes elements which perform functions similar to functions performed by elements of FIG. 1 and these elements bear the same reference numerals in FIG. 5. Surfaces 24 and 28 of beam splitter 22 and 27 respectively comprise surfaces having conventional dielectric coatings positioned thereon. These surfaces are oblique with respect to incident light beams and exhibit a preference for transmitting components in a first direction and for reflecting components in a second orthogonal direction. The optical characteristics of the surface 24 and 28 each exhibit the following relationships: $T_s = R_p$ and $T_p = R_s$ That is, the surface 24 transmits a secondary (extraordinary) wave equal in magnitude to the magnitude of a reflected principal (ordinary) wave $R_p$ and transmits a principal (ordinary) wave $T_p$ equal in magnitude of a reflected secondary (extraordinary) wave $R_s$.

A circularly polarized input beam to the splitter 22 is divided into a elliptically polarized transmitted beam $I_o t_1$ and a reflected orthogonally related elliptically polarized beam $I_o r_1$ having a vector with an opposite sense of rotation with respect to $I_o t_1$. The direction of rotation of the reflected beam $I_o t_1$ is reversed by the reflector 14 and the orthogonally related elliptically polarized beams $I_o r_1$ and $I_o t_1$ are combined at the surface 28. The resultant wave $I_{res}$ is generally elliptically polarized. However, when the reference and reflected beams are equal, the locus of the resultant on Poincare's sphere is a tipped great circle which interests the circle of linear polarization at two points. Since the combined beams are orthogonally related, this elliptically polarized resultant wave can be represented as a circle on Poincare's sphere. Retarding means are provided for rotating this circle into coincidence with the circle of linearly polarized light. In FIG. 5, quarter wave plates 200 and 202 cause retardation of this resultant wave by an amount sufficient to provide rotation of the circle of resultant polarization into coincidence with the circle of linearly polarized light on Poincare's sphere. The amount of retardation provided by these plates depends upon the factor $T_s$, $R_p$, $T_p$ and $R_s$ of the surfaces 24 and 28. An output beam from the retarding means comprises a linearly polarized light beam having an angle or rotation which varies in accordance with displacement of the object 26. The means for detecting and indicating this rotation and corresponding displacement of the object were described with respect to FIG. 1.

Figure 3:
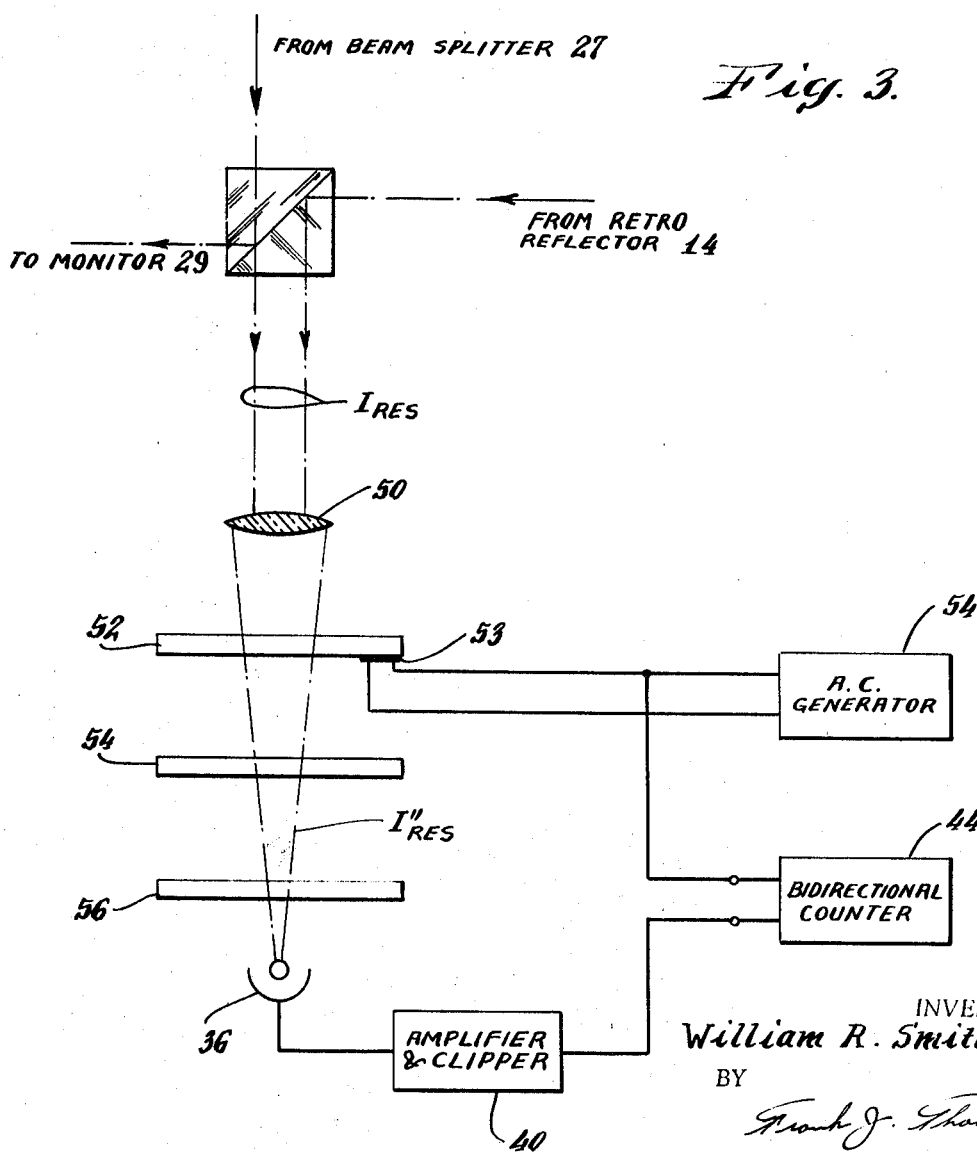
FIG. 3 is a diagram illustrating an arrangement utilizing a single photocell for detecting the magnitude and direction of object displacement.

FIG. 3 illustrates another arrangement for detecting and indicating the direction and magnitude of displacement of the object 26. A single photocell is utilized in this arrangement and any disadvantageous variations in relative photocell characteristics of a dual photocell arrangement is thus avoided. Those components of FIG. 3 performing similar functions as the components of FIG. 3 performing similar functions as the components of FIG. 1 bear the same reference numerals. The linearly polarized output beam $I_{res}$ from the beam splitter 27 and which is produced in the same manner as $I_{res}$ of FIG. 1 is focused on a single photocell 36 by a lens 50. The beam is transmitted successively through an optical chopper or switch 52 which is excited by an electrical generator 54 and which functions as a rotating one quarter wave plate; through a one quarter wave plate 5; and through a circular polarizer 56. Optical chopper 52, which is described and claimed in my copending U.S. Pat. application Ser. No. 566,037 filed on July 18, 1966, and which is assigned to the assignee of the present invention comprises an optical quality isotropic material which exhibits birefringence when mechanically stressed. The chopper 52 includes a piezoelectric transducer 53, which is electrically excited by the generator 54 to cause mechanical vibrations in the optical material.

A combined effect of the chopper 52 and quarter wave plate 55 on the linearly polarized beam $I_{res}$ is the generation of an output vector $I''_{res}$ which rotates at a frequency $f_1$ when the object 26 and phase angle $\theta$ are constant. This rotating vector is transmitted preferentially by the polarizer 56 when the angle of the vector $I''_{res}$ corresponds to the plane of polarization of the polarizer 56. As the object 26 is displaced and the phase angle $\theta$ of the vector $I_{res}$ varies, the frequency of rotation of the vector $I''_{res}$ also varies and at a rate in accordance with the magnitude of object displacement. This frequency variation will be an increase or decrease corresponding to the direction of object displacement. An output signal from the photocell of FIG. 3 is a frequency modulated signal. For example, the generator 54 excites the chopper 52 at some frequency $f_1$. As the object 26 is being displaced at a constant rate in one direction, the output frequency of the photocell is, for example, $f_1 + f_2$ while a displacement in the opposite direction at the same constant rate generates a photocell signal having a frequency $f_1 - f_2$. The photocell signal is applied to the counter 44 through the amplifier and clipper 40 while the output of generator 54 is also applied to the counter 44. Counter 44 provides a resultant count indicative of the object's displacement. The direction of displacement is indicated by an increase or decrease in the initially accumulated count.

It is desirable at times to detect the velocity of displacement of the object 26. The detector arrangement of FIG. 3 provides an output signal from the photocell 36, in response to motion of the body 26, having a frequency which is a linear function of the velocity. In FIG. 4, an alternative arrangement of the detector of FIG. 3 is adapted for providing an analog output signal $e_o$ proportional to the velocity. An amplified signal output from the amplifier 40 is applied to a frequency detecting means such as a frequency discriminator circuit 204. Various forms of this discriminator circuit arrangement are well known in the art. The output $e_o$ from the discriminator is applied to a utility means such as a display indicator 206, recorder, or control device.

In a particular arrangement which is not considered to be limiting in any respect, the following components were employed in an interferometer in accordance with FIG. 1.

| | |
|---|---|
| Laser 10 | Perkin-Elmer Type 5200 |
| Plate 20 | Polaroid one-quarter waveplate |
| Beam splitters 22, 27, 30 | Edmund Scientific Type 30,329 |
| Retroreflector 14 | Perkin-Elmer 02367 |
| Polarizer 32, 34 | Polaroid HN 32 |
| Photocells 36, 38 | Texas Instruments LS-400 |

While I have illustrated and described particular embodiments of my invention, it will be understood that various modifications may be made therein without departing from the spirit of the invention and the scope of the appended claims.

I claim:

1. An interferometer for detecting and indicating motion of an object comprising:
   light reflector means coupled to the object in a manner for movement therewith upon displacement of the object;
   means for causing a first light beam having a predetermined polarization to impinge upon said reflector means;
   said reflector means adapted for reflecting the impinging light beam;
   means for causing a second light beam having a same predetermined polarization and orthogonally related with respect to the reflected beam to combine with the reflected beam and to provide a resultant linearly polarized light beam having a plane of polarization rotatable upon displacement of the object; and,
   means for operating on said uniformly polarized light beam to provide an electrical output signal having a frequency modulation component varying in accordance with the velocity of displacement of the object and for detecting said modulation component to provide an indication of the velocity of displacement of said object.

2. The interferometer of claim 1 wherein said transmission means includes reflective surface means mounted on said object and positioned along said path of variable length.

3. In an interferometer for measuring distance:
   a light reflector means coupled to a movable object for movement therewith, said reflector means having reflective surfaces adapted for reversing the direction of propagation of a polarized impinging light beam along a path differing from an incident beam path and for reversing the direction of polarization thereof;
   a light beam splitter adapted for dividing an impinging light beam into transmitted and reflected components;
   light source means including a laser light source arranged for causing polarized light which is polarized in a first direction to impinge upon said beam splitter;
   a light beam combination means;
   said beam splitter positioned with respect to said reflector means and with respect to said light beam combination means for causing a transmitted light component to impinge upon said reflector means and for directing a reflected component from said first beam splitter to said light beam combination means whereby the transmitted and reflected beams are of substantially equal intensity;
   said light beam combination means positioned with respect to said first beam splitter and with respect to said reflector means for causing a combination of a reflected light component from said first beam splitter and a reflected light component from said reflector means and for providing a resultant linearly polarized light beam having a plane of polarization rotatable in accordance with motion of the object;
   means disposed in the path of said linearly polarized light beam and adapted for transmitting said light beam at first and second predetermined planes of polarization; and, means positioned with respect to said latter means for generating first and second electrical signals representative of the magnitude and direction of motion of the interference fringes.

4. The interferometer of claim 3 wherein said light beam combination means comprises a second beam splitter and an optical retarding means.